(No Model.)

J. SWAN.
SCREW DRIVER.

No. 523,555. Patented July 24, 1894.

WITNESSES
H. A. Lamb,
S. V. Richardson.

INVENTOR
James Swan
By A. M. Wooster
Atty.

United States Patent Office.

JAMES SWAN, OF SEYMOUR, CONNECTICUT.

SCREW-DRIVER.

SPECIFICATION forming part of Letters Patent No. 523,555, dated July 24, 1894.

Application filed May 10, 1894. Serial No. 510,791. (No model.)

*To all whom it may concern:*

Be it known that I, JAMES SWAN, a citizen of the United States, residing at Seymour, in the county of New Haven and State of Connecticut, have invented certain new and useful Improvements in Screw-Drivers and; I do hereby declare the following to be a full, clear, and exact description of the invention, such as will enable others skilled in the art to which it appertains to make and use same.

My invention has for its object to simplify and cheapen the construction of screw-drivers so that the cost of production shall be reduced to the minimum and at the same time to provide a screw-driver which it shall be practically impossible to loosen in ordinary use.

With these ends in view I have devised the novel construction of which the following description, in connection with the accompanying drawings, is a specification, numbers and letters being used to designate the several parts.

Figure 1:
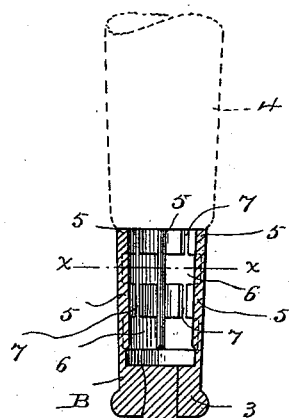
Figure 2:
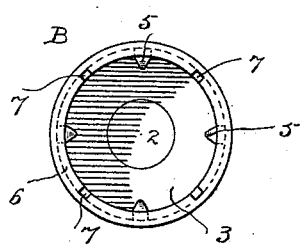
Figure 3:
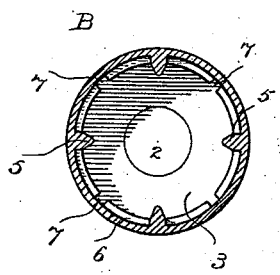

Figure 1 is a sectional view illustrating the construction of my novel screw-driver the handle being indicated by dotted lines. Fig. 2 a view on an enlarged scale looking into the ferrule detached, and Fig. 3 is a section on an enlarged scale on the line *x x* in Fig. 1.

A denotes the driver having a shank 2, B the ferrule having a head 3, and 4 the handle which is ordinarily made of wood. The shank of the driver and the ferrule are united solidly together either by casting the ferrule upon the shank or by shrinking it thereon.

The essentially novel feature of my invention consists in providing the ferrule on its inner sides with one or more longitudinal ribs 5, with one or more circular grooves 6 which are crossed by the ribs and with one or more longitudinal grooves 7, the circular grooves and the longitudinal grooves being of the same depth and extending into each other. As already stated the shank of the driver is secured in the head of the ferrule by casting or shrinking the ferrule upon the shank which is one of the simplest and cheapest of mechanical operations, and the ferrule is secured to the handle by simply driving it thereon which is the simplest and cheapest known mode of attaching.

The effect of driving my novel ferrule, provided with ribs and grooves already described, upon the handle is as follows: The longitudinal rib or ribs necessarily displace considerable wood as the ferrule is driven to place. The wood displaced in the plane of the circular groove or grooves is necessarily pressed into these grooves. This renders it practically impossible to draw the ferrule off after it has once been driven on but does not however, give quite as strong protection against the ferrule turning, as I desire. This protection against the handle turning in the ferrule however, I secure in the most effectual manner by providing the longitudinal groove or grooves 7 into which wood displaced by the longitudinal ribs in other planes than those of the circular grooves is forced as the ferrule is driven to place. I find in practice that by casting or shrinking strong heavy ferrules upon the shanks of the drivers and by providing the inner sides of the ferrules with one or more longitudinal ribs and grooves and with one or more circular grooves I am enabled to furnish a screw-driver which it is practically impossible to loosen in the ferrule or to detach from the handle by any of the strains incident to ordinary use, for example the strength of any ordinary man is not sufficient to loosen the handle from the ferrule as both the longitudinal and circular grooves will be filled by wood displaced by the longitudinal ribs.

Having thus described my invention, I claim—

1. A screw-driver comprising a handle, a shank, a ferrule rigidly secured thereto and provided with a longitudinal rib, with a circular groove which is crossed by the rib and with a longitudinal groove so that when the ferrule is driven upon the handle material is displaced by the rib and forced into the grooves so as to hold the ferrule against removal and from being turned upon the handle.

2. A ferrule for screw-drivers having upon its inner side a longitudinal rib, a circular groove which is crossed by said rib, and a longitudinal groove, so that when the ferrule is forced upon a handle material displaced by the rib will be forced into the longitudinal and circular grooves, as and for the purpose set forth.

In testimony whereof I affix my signature in presence of two witnesses.

JAMES SWAN.

Witnesses:
A. M. WOOSTER,
S. V. RICHARDSON.